United States Patent
Tateishi et al.

(10) Patent No.: US 9,823,633 B2
(45) Date of Patent: Nov. 21, 2017

(54) NUMBER-OF-MACHINES CONTROL DEVICE FOR HEAT SOURCE SYSTEM, METHOD THEREFOR, AND HEAT SOURCE SYSTEM

(71) Applicant: MITSUBISHI HEAVY INDUSTRIES, LTD., Tokyo (JP)

(72) Inventors: Koki Tateishi, Tokyo (JP); Minoru Matsuo, Tokyo (JP); Satoshi Nikaido, Tokyo (JP); Toshiaki Ouchi, Tokyo (JP)

(73) Assignee: MITSUBISHI HEAVY INDUSTRIES THERMAL SYSTEMS, LTD., Tokyo (JP)

( * ) Notice: Subject to any disclaimer, the term of this patent is extended or adjusted under 35 U.S.C. 154(b) by 607 days.

(21) Appl. No.: 14/371,662

(22) PCT Filed: Feb. 27, 2013

(86) PCT No.: PCT/JP2013/055107
§ 371 (c)(1),
(2) Date: Jul. 10, 2014

(87) PCT Pub. No.: WO2013/129464
PCT Pub. Date: Sep. 6, 2013

(65) Prior Publication Data
US 2014/0358253 A1 Dec. 4, 2014

(30) Foreign Application Priority Data
Feb. 29, 2012 (JP) .................................. 2012-044674

(51) Int. Cl.
*G05B 15/02* (2006.01)
*F24F 11/00* (2006.01)
(Continued)

(52) U.S. Cl.
CPC ............ *G05B 15/02* (2013.01); *F24F 11/006* (2013.01); *F25B 1/053* (2013.01); *F25B 49/025* (2013.01);
(Continued)

(58) Field of Classification Search
None
See application file for complete search history.

(56) References Cited

U.S. PATENT DOCUMENTS

2012/0138149 A1* 6/2012 Hatada ...................... F24H 1/10
137/1
2012/0174609 A1 7/2012 Matsuo et al.
2013/0098084 A1* 4/2013 Matsuo ..................... F25B 1/10
62/129

FOREIGN PATENT DOCUMENTS

JP 8-178447 A 7/1996
JP 2000-018672 A 1/2000
(Continued)

OTHER PUBLICATIONS

Office Action dated May 20, 2016, issued in counterpart Chinese Patent Application No. 201380010675.8, with English translation. (11 pages).
(Continued)

*Primary Examiner* — Umut Onat
(74) *Attorney, Agent, or Firm* — Westerman, Hattori, Daniels & Adrian, LLP (57) ABSTRACT

A control device and method for preventing the start and stop of heat source machines from being frequently repeated. The control device determining whether or not basic conditions for decreasing the number of machines are satisfied when the number of currently operating machines is increased by one is determined if a current operational status satisfies basic conditions for increasing the number of machines, and one heat source machine is started if it is
(Continued)

determined that the basic conditions for decreasing the number of machines are not satisfied, and determining whether or not the basic conditions for increasing the number of machines are satisfied when the number of currently operating machines is decreased by one are satisfied if a current operational status satisfies the basic conditions for decreasing the number of machines, and one heat source machine is stopped if it is determined that the basic conditions for increasing the number of machines are not satisfied.

10 Claims, 10 Drawing Sheets

(51) Int. Cl.
| | | |
|---|---|---|
| *F25B 1/053* | (2006.01) | |
| *F25B 49/02* | (2006.01) | |
| *F25B 1/10* | (2006.01) | |
| *F25B 25/00* | (2006.01) | |
| *F25B 40/02* | (2006.01) | |

(52) U.S. Cl.
CPC ............... *F25B 1/10* (2013.01); *F25B 25/005* (2013.01); *F25B 40/02* (2013.01); *F25B 2339/047* (2013.01); *F25B 2341/0662* (2013.01); *F25B 2400/072* (2013.01); *F25B 2400/13* (2013.01); *F25B 2400/23* (2013.01); *F25B 2600/021* (2013.01); *F25B 2700/195* (2013.01); *F25B 2700/197* (2013.01); *F25B 2700/21161* (2013.01); *F25B 2700/21163* (2013.01); *F25B 2700/21171* (2013.01); *Y02B 30/741* (2013.01)

(56) References Cited

FOREIGN PATENT DOCUMENTS

| | | |
|---|---|---|
| JP | 2000-257938 A | 9/2000 |
| JP | 2001-263755 A | 9/2001 |
| JP | 2003-121024 A | 4/2003 |
| JP | 2005-114295 A | 4/2005 |
| JP | 2006-153324 A | 6/2006 |
| JP | 3978080 B2 | 9/2007 |
| JP | 2008-134013 A | 6/2008 |
| JP | 2008-292043 A | 12/2008 |
| JP | 2009-063231 A | 3/2009 |
| JP | 2010-175093 A | 8/2010 |
| JP | 2011-21855 A | 2/2011 |
| JP | 2011-106699 A | 6/2011 |

OTHER PUBLICATIONS

Notification of Grant of Invention Patent dated Oct. 25, 2016, issued in Chinese Patent Application No. 201380010675.8, with English translation. (4 pages). Concise Explanation of Relevance: The Notification of Grant of Invention Patent has been received.
Decision of a Patent Grant dated Jun. 30, 2015, issued in counterpart Japanese Application No. 2012-044674 (3 pages). Explanation of Relevancy "The Decision to Grant a Patent has been received."
International Search Report dated May 14, 2013, issued in corresponding application No. PCT/JP2013/055107.
Written Opinion dated May 14, 2013, issued in corresponding application No. PCT/JP2013/055107.
Extended European Search Report dated Dec. 23, 2015, issued in European Patent Application No. 13754535.6 (7 pages).
Notice of Allowance dated Feb. 1, 2016, issued in counterpart Korean Patent Application No. 10-2014-7019787, with English translation. (5 pages).

\* cited by examiner

NUMBER-OF-MACHINES CONTROL DEVICE FOR HEAT SOURCE SYSTEM, METHOD THEREFOR, AND HEAT SOURCE SYSTEM

TECHNICAL FIELD

The present invention relates to a number-of-machines control device for a heat source system, a method therefor, and a heat source system.

BACKGROUND ART

As a method of controlling the number of heat source machines in a heat source system including a plurality of heat source machines, for example, a method disclosed in PTL 1 is known. PTL 1 discloses determining a load factor range where the coefficients of performance (COP) in individual inverter drive turbo heat source machines become equal to or greater than a predetermined value, respectively, and controlling the inverters so that the load factors of the individual inverter drive heat source machines fall within the determined load factor range.

CITATION LIST

Patent Literature

[PTL 1] Japanese Unexamined Patent Application Publication No. 2005-114295

SUMMARY OF INVENTION

Technical Problem

As described above, when the control of the number of heat source machines is performed using the preset load factor range, the following number-of-machines control is considered.

For example, if the load factors of the operating heat source machines exceed an upper limit of the load factor range, the number of heat source machines is increased, and if the load factors of the heat source machines fall below a lower limit of the load factor range, the number of heat source machines is decreased.

Figure 7:
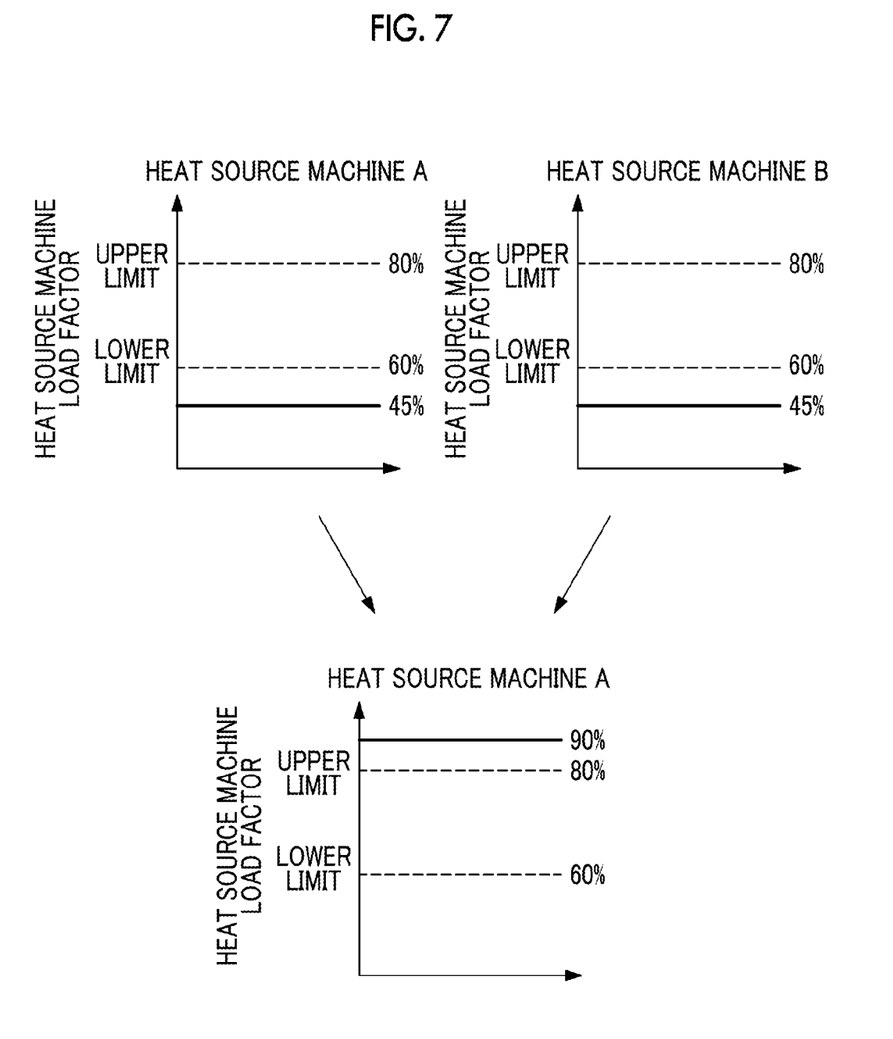
FIG. 7 is a view for describing problems of the number-of-machines control of the related art.

However, in this method, the start and stop of the heat source machines may be frequently repeated. For example, as shown in FIG. 7, when the upper limit of the load factor range is set to 80% and the lower limit thereof is set to 60%, and when the number of heat source machines is decreased by one because the load of two heat source machines A and B is 45% and falls below 60% of the lower limit of the load factor range, the load factor of one heat source machine A reaches 90% after the number-of-machines decreases, and consequently exceeds 80% that is the upper limit of the load factor range. Accordingly, the number-of-machines increase of heat source machines is performed, and consequently, the number-of-machines decrease and the number-of-machines increase of the heat source machines occur repeatedly.

As another number-of-machines control method, for example, a method is considered in which the number of heat source machines is increased by one if the load factors of respective operating heat source machines when the number of the heat source machines is increased by one exceed the lower limit of the load factor range, and the number of heat source machines is decreased by one if the load factors of respective operating heat source machines when the number of the heat source machines is decreased by one fall within the upper limit of the load factor range.

Figure 8:
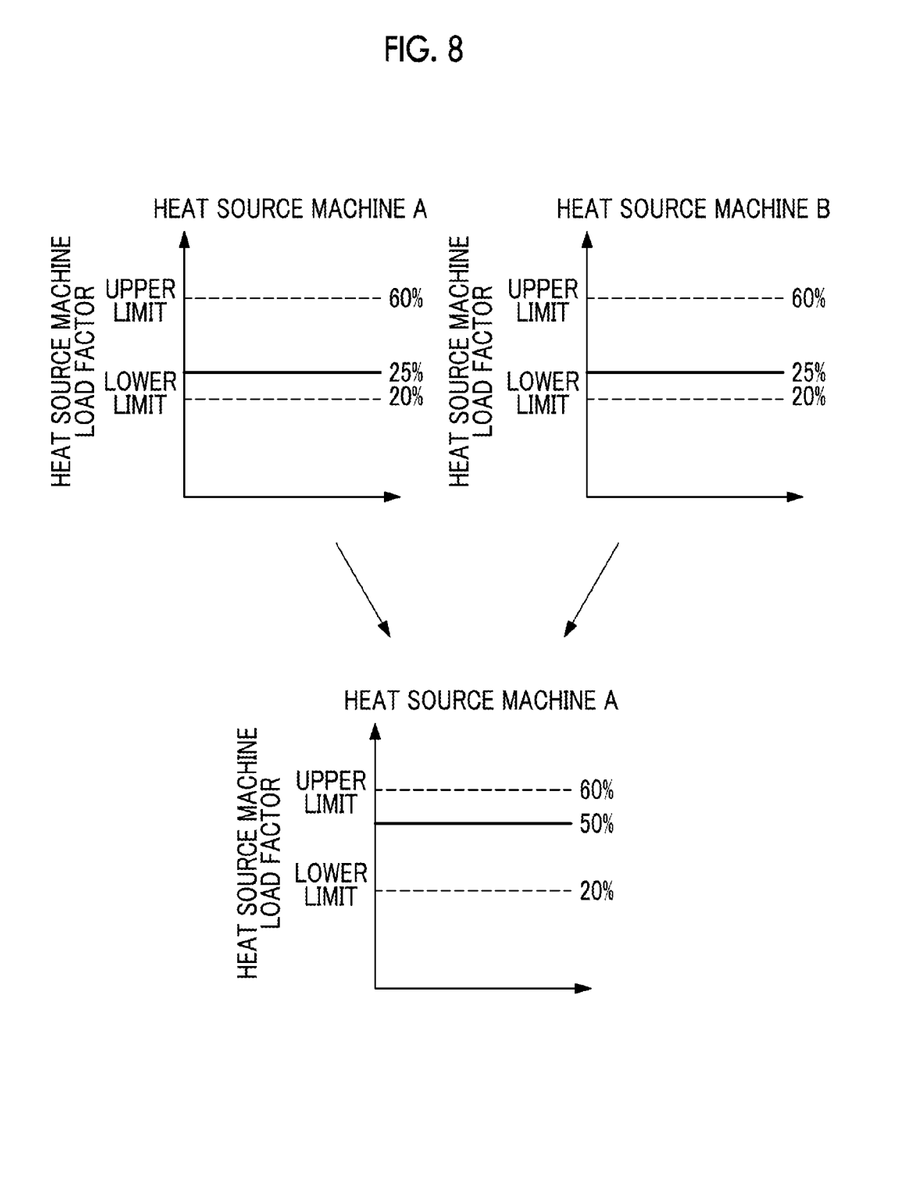
FIG. 8 is a view for describing problems of the number-of-machines control of the related art.

However, also in this method, the start and stop of the heat source machines may be frequently repeated. For example, as shown in FIG. 8, when the upper limit of the load factor range is set to 60% and the lower limit thereof is set to 20%, and when the refrigeration load of the two heat source machines A and B is 25%, the heat source machine load when the number of heat source machine is decreased by one is 50%. Therefore, the number of heat source machines is decreased by one determining that the conditions of the number-of-machines decrease are satisfied. After the number of machines is decreased by one, the load factor of the heat source machine A is 50%. As a result, now, the heat source machine load when the number of heat source machines is increased by one is 25%. Therefore, the conditions of the number-of-machines increase are satisfied, and the number of heat source machines is increased by one. Accordingly, the number-of-machines decrease and the number-of-machines increase of the heat source machines occur repeatedly.

An object of the invention is to provide a number-of-machines control device for a heat source system, a method therefor, and a heat source system that can prevent the start and stop of heat source machines from being frequently repeated.

Solution to Problem

A first aspect of the invention is a number-of-machines control device for a heat source system that is applied to a heat source system including a plurality of heat source machines and outputs a start command and a stop command to the respective heat source machines, to thereby perform a number-of-machines control of the heat source machines. The number-of-machines control device includes storage means for storing basic conditions for increasing the number of machines in which basic conditions when increasing the number of heat source machines are specified in a relationship between the refrigeration load and the required refrigeration load of the heat source machines, and basic conditions for decreasing the number of machines in which basic conditions when decreasing the number of heat source machines are specified in a relationship between the refrigeration load and the required refrigeration load of the heat source machines; start instruction means for determining whether or not the basic conditions for decreasing the number of machines are satisfied when the number of currently operating machines is increased by one if the basic conditions for increasing the number of machines are satisfied, and for starting one heat source machine if it is determined that the basic conditions for decreasing the number of machines are not satisfied; and stop instruction means for determining whether or not the basic conditions for increasing the number of machines are satisfied when the number of currently operating machines is decreased by one if the basic conditions for decreasing the number of machines are satisfied, and for stopping the one heat source machine if it is determined that the basic conditions for increasing the number of machines are not satisfied.

According to this aspect, if it is determined that the current operational status satisfies the basic conditions for increasing the number of machines, a case where a number-of-machines increase is actually performed according to this determination is supposed, and a final determination for the number-of-machines increase is made after it is confirmed that the basic conditions for decreasing the number of machines are not satisfied in this state. Additionally, similarly, if it is determined that the current operational status satisfies the basic conditions for decreasing the number of machines, a case where a number-of-machines decease is actually performed according to this determination is supposed, and a final determination for the number-of-machines decrease is made after it is confirmed that the basic conditions for increasing the number of machines are not satisfied in this state. Accordingly, the number-of-machines decrease and the number-of-machines increase can be kept from being frequently repeated.

In the above number-of-machines control device for a heat source system, the start instruction means may determine that the basic conditions for increasing the number of machines are satisfied if the required refrigeration load is greater than a first refrigeration load when operating the respective operating heat source machines at an upper limit of a preset load factor range.

In the above number-of-machines control device for a heat source system, the stop instruction means may determine that the basic conditions for decreasing the number of machines are satisfied if the required refrigeration load is smaller than a second refrigeration load when operating the respective operating heat source machines at a lower limit of a preset load factor range.

In the above number-of-machines control device for a heat source system, the start instruction means may determine whether or not a state where the basic conditions for decreasing the number of machines are not satisfied is maintained for a preset predetermined time when the number of currently operating machines is increased by one, and starts the one heat source machine if the state where the conditions are not satisfied is maintained for the predetermined time.

By performing the final determination for the number-of-machines increase in consideration of the operational status in the predetermined period in this way, influence of noise can be avoided and erroneous determination of the number-of-machines increase can be reduced.

In the above number-of-machines control device for a heat source system, the stop instruction means may determine whether or not a state where the basic conditions for increasing the number of machines are not satisfied is maintained for a preset predetermined time when the number of currently operating machines is decreased by one, and may stop the one heat source machine if the state where the conditions are not satisfied is maintained for the predetermined time.

By determining whether or not the predetermined period is maintained in this way, influence of noise can be avoided, and erroneous determination of the number-of-machines decrease can be reduced.

In the above number-of-machines control device for a heat source system, the required refrigeration load may be a value obtained by equalizing the required refrigeration load in a preset predetermined time.

By using an equalizing value in a predetermined period in this way, influence of noise can be avoided, and erroneous determination of the number-of-machines increase or the number-of-machines decrease can be reduced.

In the above number-of-machines control device for a heat source system, the start instruction means may hold a forced number-of-machines increase load factor set to a value equal to or greater than the upper limit of the load factor range, and may forcedly start one heat source machine when the load factor of the heat source machines is equal to or greater than the forced number-of-machines increase load factor.

Since the forced load factor is set in this way and the number-of-machines increase is forcedly performed when the heat source machine load factor reaches the forced number-of-machines increase load factor, it is possible to perform an operation that more reliably satisfies the required load.

In the above number-of-machines control device for a heat source system, the stop instruction means may hold a forced number-of-machines decrease load factor set to a value equal to or smaller than a lower limit of the load factor range, and may forcedly stop one heat source machine when the load factor of the heat source machines is equal to or smaller than the forced number-of-machines decrease load factor.

Since the forced number-of-machines decrease load factor is set in this way and the number-of-machines decrease is forcedly performed when the heat source machine load factor reaches the forced number-of-machines decrease load factor, the respective heat source machines can be operated in a more suitable state.

A second aspect of the invention is a heat source system including a plurality of heat source machines; and the number-of-machines control device for a heat source system according to any one of the above.

A third aspect of the invention is a number-of-machines control method for a heat source system that is applied to a heat source system including a plurality of heat source machines and outputs a start command and a stop command to the respective heat source machines, to thereby perform a number-of-machines control of the heat source machines. The basic conditions for increasing the number of machines in which basic conditions when increasing the number of heat source machines are specified in a relationship between the refrigeration load and the required refrigeration load of the heat source machines, and basic conditions for decreasing the number of machines in which basic conditions when decreasing the number of heat source machines are specified in a relationship between the refrigeration load and the required refrigeration load of the heat source machines, are stored in advance. The number-of-machines control method includes a start instruction step of determining whether or not the basic conditions for decreasing the number of machines are satisfied when the number of currently operating machines is increased by one if the basic conditions for increasing the number of machines are satisfied, and starting one heat source machine if it is determined that the basic conditions for decreasing the number of machines are not satisfied; and a stop instruction step of determining whether or not the basic conditions for increasing the number of machines are satisfied when the number of currently operating machines is decreased by one if the basic conditions for decreasing the number of machines are satisfied, and stopping one heat source machine if it is determined that the basic conditions for increasing the number of machines are not satisfied.

Advantageous Effects of Invention

According to the invention, the effect that the start and stop of the heat source machines can be prevented from being frequently repeated is exhibited.

DESCRIPTION OF EMBODIMENTS

[First Embodiment]

Hereinafter, a number-of-machines control device for a heat source system, a method therefor, and a heat source system related to a first embodiment of the invention will be described with reference to the drawings.

Figure 1:
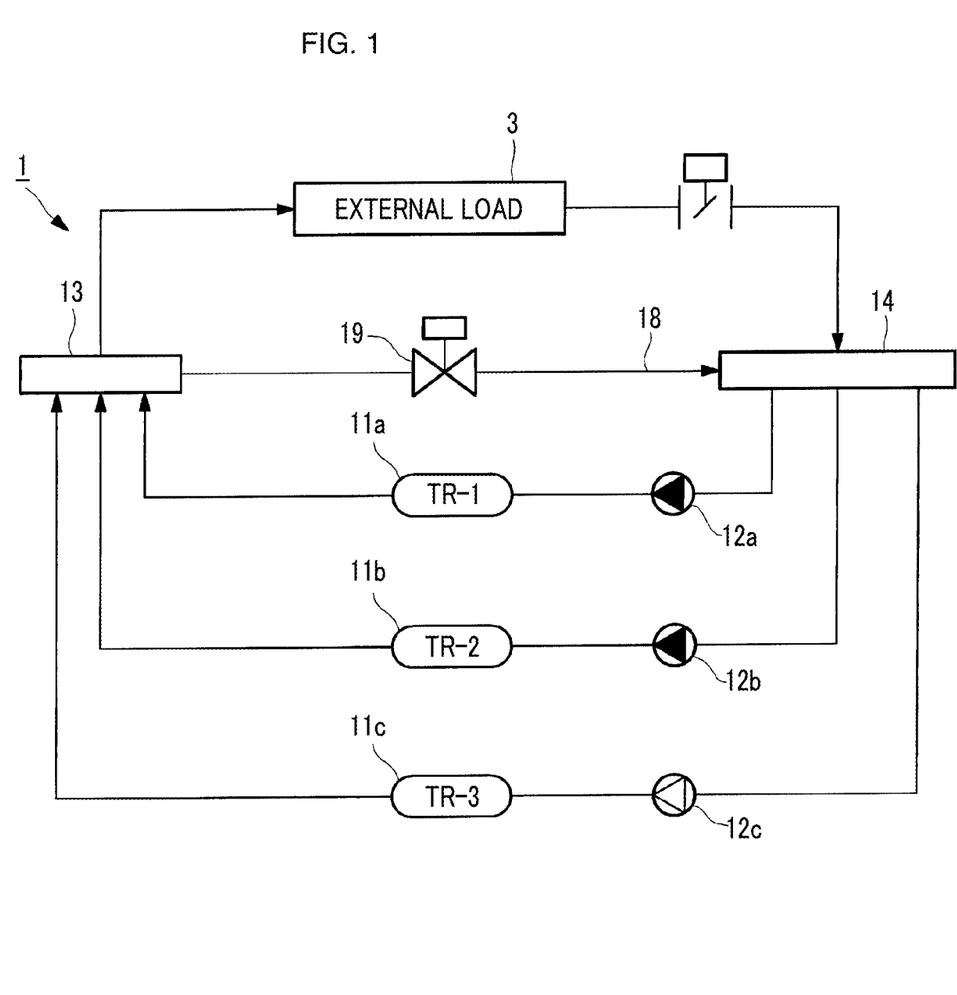
FIG. 1 is a view schematically showing the configuration of a heat source system related to a first embodiment of the invention.

FIG. 1 is a view schematically showing the configuration of the heat source system 1 related to the first embodiment of the invention. The heat source system 1 includes a plurality of heat source machines 11a, 11b, and 11c that cool or heat cooling water (heat medium) to be supplied to, for example, an external load 3, such as an air conditioner, a water heater, and a plant facility. Although a case where three heat source machines 11a, 11b, and 11c are installed is illustrated in FIG. 1, the number of heat source machines to be installed can be arbitrarily determined.

Cooling water pumps 12a, 12b, and 12c that pump the cooling water are respectively installed on upstream sides of the respective heat source machines 11a, 11b, and 11c seen from a cooling water flow. The cooling water from a return header 14 is sent to the respective heat source machines 11a, 11b, and 11c by the cooling water pumps 12a, 12b, and 12c. As the cooling water pumps 12a, 12b, and 12c are driven by an inverter motor (not shown) and thereby the rotation speeds thereof are made variable, a variable flow rate control is performed.

The cooling water obtained in the respective heat source machines 11a, 11b, and 11c is collected in the supply header 13. The cooling water collected in the supply header 13 is supplied to the external load 3. The cooling water, which has been presented for air-conditioning or the like in the external load 3 and changed in temperature, is sent to the return header 14. The cooling water branches in the return header 14, and is sent to the respective heat source machines 11a, 11b, and 11c.

A bypass line 18 is provided between the supply header 13 and the return header 14. By adjusting the opening degree of a bypass valve 19 provided at the bypass line 18, the amount of cooling water to be supplied to the external load 3 can be adjusted.

Figure 2:
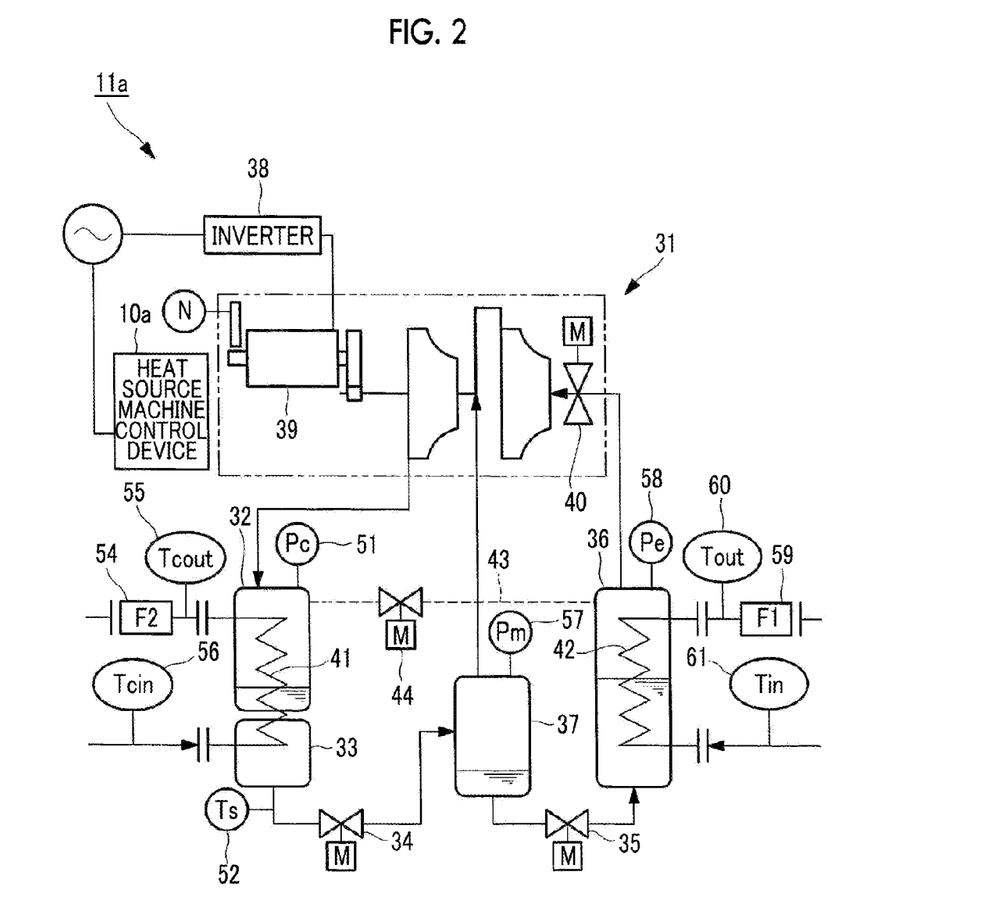
FIG. 2 is a view showing a detailed configuration in a case where turbo heat source machines are applied as heat source machines of FIG. 1.

A detailed configuration in a case where turbo refrigerators are applied to the heat source machines 11a, 11b, and 11c is shown in FIG. 2. For the purpose of easy understanding, only one heat source machine 11a among the three heat source machines provided side by side is shown in this drawing.

The heat source machine 11a is configured to realize a two-stage expansion two-stage compression sub-cooling cycle. This turbo refrigerator includes a turbo compressor 31 that compresses a refrigerant, a condenser that condenses a high-temperature high-pressure gas refrigerant compressed by the turbo compressor 31, a subcooler 33 that supercools a liquid refrigerant condensed by the condenser 32, a high-pressure expansion valve 34 that expands the liquid refrigerant from the subcooler 33, an intercooler 37 that is connected to the high-pressure expansion valve 34 and is connected to an intermediate stage of the turbo compressor 31 and a low-pressure expansion valve 35, and an evaporator 36 that evaporates the liquid refrigerant expanded by the low-pressure expansion valve 35.

The turbo compressor 31 is a centrifugal two-stage compressor and is driven by an electric motor 39 of which the rotation speed is controlled by an inverter 38. The output of the inverter 38, is controlled by a heat source machine control device 10a. An inlet guide vane (hereinafter referred to as "IGV") 40, which controls the flow rate of a suctioned refrigerant, is provided at a refrigerant suction port of the turbo compressor 31 to allow the capability of the turbo heat source machine 11a to be controlled.

The condenser 32 is provided with a pressure sensor 51 that measures condensed refrigerant pressure Pc. The output of the pressure sensor 51 is transmitted to the heat source machine control device 10a.

The subcooler 33 is provided on a refrigerant flow downstream side of the condenser 32 so as to subcool the condensed refrigerant. A temperature sensor 52 that measures a refrigerant temperature Ts after supercooling is provided immediately after the refrigerant flow downstream side of the subcooler 33.

The condenser 32 and the subcooler 33 has a cooling heat transfer tube 41 cooling these condenser and subcooler inserted therethrough. A cooling water flow rate F2 is measured by a flow meter 54, a cooling water outlet temperature Tcout is measured by a temperature sensor 55, and a cooling water inlet temperature Tcin is measured by a temperature sensor 56. The cooling water is heat-exhausted to the outside in a cooling tower (not shown), and is then led to the condenser 32 and the subcooler 33 again.

The intercooler 37 is provided with a pressure sensor 57 that measures an intermediate pressure Pm. The evaporator 36 is provided with a pressure sensor 58 that measures an evaporation pressure Pe. Cooling water with a rated temperature (for example, 7° C.) is obtained by being heat-absorbed in the evaporator 36. A cooling water heat transfer tube 42 that cools the cooling water to be supplied to the external load 3 (refer to FIG. 1) is inserted through the evaporator 36. A cooling water flow rate F1 is measured by a flow meter 59, a cooling water outlet temperature Tout is measured by a temperature sensor 60, and a cooling water inlet temperature Tin is measured by a temperature sensor 61.

A hot gas bypass pipe 43 is provided between a gaseous phase portion of the condenser 32 and a gaseous phase portion of the evaporator 36. Also, a hot gas bypass valve 44 is provided to control the flow rate of the refrigerant that flows through the hot gas bypass pipe 43. By adjusting the hot gas bypass flow rate by the hot gas bypass valve 44, the capability of a very small region where control is not sufficient can be controlled in the IGV 40.

Although the case where the condenser 32 and the subcooler 33 are provided, heat exchange is performed between the refrigerant and the cooling water heat-exhausted to the outside in the cooling tower, and the cooling water is warmed has been described in the heat source machine 11a shown in FIG. 2, for example, a configuration may be adopted in which an air heat exchanger is arranged instead of the condenser 32 and the subcooler 33, and heat exchange is performed between external air and the refrigerant in the air heat exchanger.

The heat source machines 11a, 11b, and 11c applied to the present embodiment are not limited to the turbo refrigerators having only the above-described air-conditioning function, but may be, for example, those having only a heating function or both the air-conditioning function and the heating function. Additionally, the medium heat-exchanged with the refrigerant may be water or air. The heat source machines 11a, 11b, and 11c may be unified as the same types of heat source machines, or several types of heat source machines may be mixed.

Figure 3:
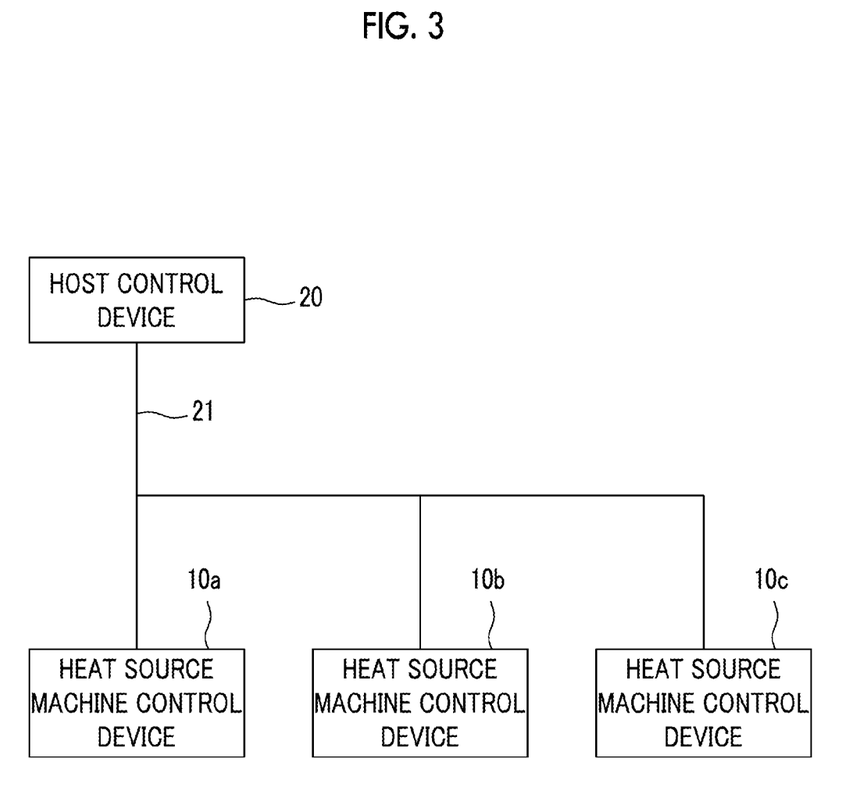
FIG. 3 is a view schematically showing the configuration of a control system of the heat source system shown in FIG. 1.

FIG. 3 is a view schematically showing the configuration of a control system of the heat source system 1 shown in FIG. 1. As shown in FIG. 3, heat source machine control devices 10a, 10b, and 10c that are control devices for the respective heat source machines 11a, 11b, and 11c are connected with a host control device (number-of-machines control device) 20 via a communication medium 21, and are configured so that bidirectional communication is possible. The host control device 20, which is, for example, a control device that controls the overall heat source system, has, for example, a number-of-machines control function that controls the number of the heat source machines 11a, 11b, and 11c to be started with respect to the required load of the external load 3.

The host control device 20 and the heat source machine control devices 10a, 10b, and 10c are, for example, a computer, and have a central processing unit (CPU), a main storage, such as a random access memory (RAM), an auxiliary storage, a communication device that communicates with an external device to perform transfer of information, or the like.

The auxiliary storage is a computer-readable recording medium, and is, for example, a magnetic disk, a magnetic-optical disk, a CD-ROM, a DVD-ROM, a semiconductor memory, or the like. Various programs are stored in the auxiliary storage, and various processing is realized as the CPU reads a program from the auxiliary storage to the main storage.

Figure 4:
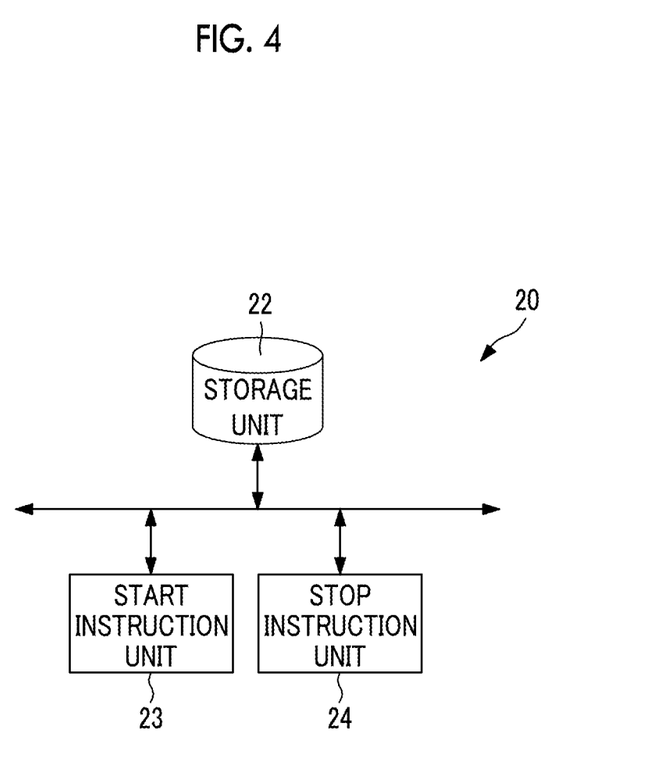
FIG. 4 is a functional block diagram mainly showing a function related to the number-of-machines control of a host control device related to the first embodiment of the invention.

FIG. 4 is a functional block diagram mainly showing a function related to the number-of-machines control of the host control device 20 related to the present embodiment. As shown in FIG. 4, the host control device includes a storage unit (storage means) 22, a start instruction unit (start instruction means) 23, and a stop instruction unit (stop instruction means) 24 as main components.

Basic conditions for increasing the number of machines in which basic conditions when increasing the number of heat source machines are specified in a relationship between the refrigeration load and the required refrigeration load of the heat source machines, and basic conditions for decreasing the number of machines in which basic conditions when decreasing the number of heat source machines are specified in a relationship between the refrigeration load and the required refrigeration load of the heat source machines, are stored in the storage unit 22.

In the present embodiment, the basic conditions for increasing the number of machines are specified, for example, so that the required refrigeration load is "greater than a first refrigeration load when operating the respective operating heat source machines at an upper limit of a preset load factor range", and the basic conditions for decreasing the number of machines are specified, for example, so that the required refrigeration load is "smaller than a second refrigeration load when operating the respective operating heat source machines at a lower limit of the preset load factor range".

The load factor range can be arbitrarily set. As an example, the coefficient of performance of the heat source machines is set to a load factor range that becomes equal to or greater than a predetermined value.

The start instruction unit 23 determines whether or not the basic conditions for decreasing the number of machines are satisfied when the number of currently operating machines is increased by one if a current operational status satisfies the basic conditions for increasing the number of machines, and outputs an instruction, which starts one heat source machine, to the heat source machine, if it is determined that the basic conditions for decreasing the number of machines are not satisfied.

The stop instruction unit 24 determines whether or not the basic conditions for increasing the number of machines are satisfied when the number of currently operating machines is decreased by one if the current operational status satisfies the basic conditions for decreasing the number of machines, and outputs an instruction, which stops one heat source machine, to the heat source machine, if it is determined that the basic conditions for increasing the number of machines are not satisfied.

Figure 5:
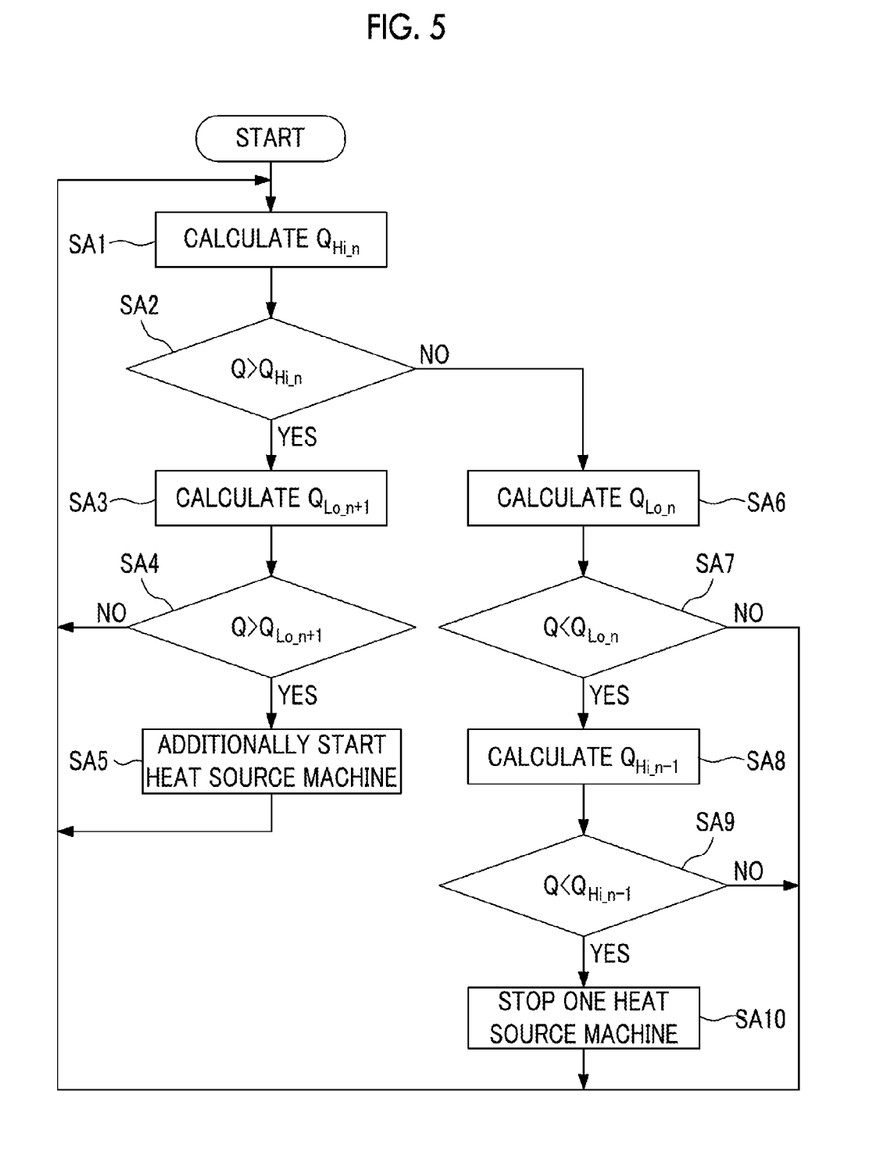
FIG. 5 is a flowchart showing a procedure of a number-of-machines control method related to the first embodiment of the invention.

Hereinafter, the number-of-machines control method executed by the host control device 20 will be described with reference to FIG. 5. FIG. 5 is a flowchart showing a procedure of the number-of-machines control method. Step SA1 to Step SA5 of FIG. 5 is executed by the above start instruction unit 23, and Step SA6 to Step SA10 is executed by the above stop instruction unit 24.

First, in Step SA1 of FIG. 5, the refrigeration load $Q_{Hi\_n}$ (first refrigeration load) of currently operating heat source machines when the heat source machines are operated at the upper limit of the preset load factor range is calculated.

The refrigeration load $Q_{Hi\_n}$ is calculated by the following Formula (1).

[Formula 1]

$$Q_{Hi\_n} = \sum_{i=1}^{n} q_{Hi\_i} \qquad (1)$$

In the above Formula (1), q is the capability of the heat source machines, Hi is the upper limit of the load factor range, and n is the number of currently operating heat source machines.

Subsequently, in Step SA2, it is determined whether or not a current required refrigeration load Q for all the heat sources is greater than the first refrigeration load $Q_{H\_n}$ calculated by Step SA1. Here, the current required refrigeration load Q is given by the following Formula (2).

$$Q = \Delta T \times Fc \times c \qquad (2)$$

In Formula (2), ΔT is the difference between the cooling water inlet temperature Tin and the cooling water outlet temperature Tout of the heat source machines, Fc is a cooling water flow rate, and c is specific heat.

In Step SA2, if the current required refrigeration load Q is greater than the first refrigeration load $Q_{Hi\_n}$, the processing proceeds to Step SA3.

In Step SA3, a third refrigeration load $Q_{Lo\_n+1}$ when a case where the number n of currently operating heat source machines is increased by one is supposed and the respective heat source machines are operated at the lower limit of the load factor range in this state is calculated.

The third refrigeration load $Q_{Lo\_n+1}$ is calculated by the following Formula (3).

[Formula 2]

$$Q_{Lo\_n+1} = \sum_{i=1}^{n+1} q_{Lo\_i} \quad (3)$$

In the above Formula (3), q is the capability of the heat source machines, Lo is the lower limit of the load factor range, and n+1 is the number of operating heat source machines after the number-of-machines increase.

Subsequently, in Step SA4, it is determined whether or not the current required refrigeration load Q is greater than the third refrigeration load $Q_{Lo\_n+1}$ As a result, if the required refrigeration load Q is equal to or smaller than the third refrigeration load $Q_{Lo\_n+1}$ ("NO" in Step SA4), the processing returns to Step SA1 without performing the number-of-machines increase. On the other hand, if the required refrigeration load Q is greater than the third refrigeration load $Q_{Lo\_n+1}$ ("YES" in Step SA4), the processing proceeds to Step SA5 where the number of heat source machines is increased by one, and returns to Step SA1.

On the other hand, in Step SA2, when the current required refrigeration load Q for all the current heat sources is equal to or smaller than the first refrigeration load $Q_{H\_n}$ calculated in Step SA1 ("NO" in Step SA2), the processing proceeds to Step SA6.

In Step SA6, a second refrigeration load $Q_{Lo\_n}$ when the currently operating heat source machines are operated at the lower limit of the preset load factor range is calculated.

The second refrigeration load $Q_{Lo\_n}$ is calculated by the following Formula (4).

[Formula 3]

$$Q_{Lo\_n} = \sum_{i=1}^{n} q_{Lo\_i} \quad (4)$$

In the above Formula (4), q is the capability of the heat source machines, Lo is the lower limit of the load factor range, and n is the number of currently operating heat source machines.

Subsequently, in Step SA7, it is determined whether or not the current required refrigeration load Q is smaller than the second refrigeration load $Q_{Lo\_n}$. As a result, if the current required refrigeration load Q is equal to or greater than the second refrigeration load $Q_{Lo\_n}$, the processing returns to Step SA1. On the other hand, if the current required refrigeration load Q is smaller than the second refrigeration load $Q_{Lo\_n}$ ("YES" in Step SA7), the processing proceeds to Step SA8.

In Step SA8, a fourth refrigeration load $Q_{Hi\_n-1}$ when a case where the number n of currently operating heat source machines is decreased by one is supposed and the respective heat source machines are operated at the upper limit of the load factor range in this state is calculated.

The fourth refrigeration load $Q_{Hi\_n-1}$ is calculated by the following Formula (5).

[Formula 4]

$$Q_{Hi\_n-1} = \sum_{i=1}^{n-1} q_{Hi\_i} \quad (5)$$

In the above Formula (5), q is the capability of the heat source machines, Hi is the upper limit of the load factor range, and n−1 is the number of operating heat source machines after the number-of-machines decrease.

Subsequently, in Step SA9, it is determined whether or not the current required refrigeration load Q is smaller than the fourth refrigeration load $Q_{Hi\_n-1}$. As a result, if the required refrigeration load Q is equal to or greater than the fourth refrigeration load $Q_{Hi\_n-1}$ ("NO" in Step SA9), the processing returns to Step SA1 without performing the number-of-machines decrease. On the other hand, if the required refrigeration load Q is smaller than the fourth refrigeration load $Q_{Hi\_n-1}$ ("YES" in Step SA9), the processing proceeds to Step SA10 where the number of heat source machines is decreased by one, and returns to Step SA1.

As described above, according to the number-of-machines control device 20 for a heat source system, the method therefor, and the heat source system 1 related to the present embodiment, the number-of-machines increase or the number-of-machines decrease is determined not only by comparing the refrigeration capability of currently starting heat source machines with the required refrigeration capability of all the heat source machines, but also comparing the refrigeration capability of all the heat source machines after the number of currently starting heat source machines is increased or decreased with the required refrigeration capability of all the heat source machines. Thus, the number-of-machines increase and the number-of-machines decrease can be kept from being frequently repeated, and stable number-of-machines control of the heat source machines can be realized.

[Second Embodimen]

Hereinafter, a number-of-machines control device for a heat source system, a method therefor, and a heat source system related to a second embodiment of the invention will be described with reference to the drawings.

Generally, the required refrigeration load Q in the heat source system is calculated from the cooling water inlet temperature Tin and the cooling water outlet temperature Tout of the heat source machines, the cooling water flow rate F1, or the like as being expressed by the above-described Formula (2). Accordingly, as noise is caused in a measurement value, the value of the required refrigeration load Q may fluctuate, and erroneous determination of the number-of-machines increase or the number-of-machines decrease may be caused.

Accordingly, in the heat source system related to the present embodiment, in order to avoid the erroneous determination of the number-of-machines increase and the number-of-machines decrease by such noise, the processing of Step SA4 and Step SA9 shown in FIG. 5 is changed to the following determination.

That is, in the present embodiment, a heat source machine is additionally started (Step SA5) if a state where the current required refrigeration load Q is greater than the third refrigeration load $Q_{Lo\_n+1}$ is maintained for a preset predetermined time (for example, 300 seconds) in Step SA4, and similarly, one heat source machine is stopped if a state where the current required refrigeration load Q is smaller than the fourth refrigeration load $Q_{Hi\_n-1}$ is maintained for a preset predetermined time (for example, 300 seconds) in Step SA9.

By adopting such a configuration, it is possible to avoid erroneous determination of the number-of-machines increase and the number-of-machines decrease in a case where the conditions are instantaneously satisfied in Step SA4 and Step SA9.

Instead of the above aspect, for example, a value obtained by equalizing the required refrigeration load Q used in Step SA4 and Step SA9 in a predetermined time may be adopted. As equalizing techniques to be used here, well-known techniques, such as averaging and first-order lag, can be adopted. This enables the same effects to be obtained.

[Third Embodiment]

Hereinafter, a number-of-machines control device for a heat source system, a method therefor, and a heat source system related to a third embodiment of the invention will be described with reference to the drawings.

For example, when the number-of-machines control related to the above-described first and second embodiments is performed, a case where the conditions of the number-of-machines increase are not met and the required load cannot be satisfied occurs even if the heat source machines are operated with a load factor of 100% with respect to the rated load.

Figure 6:
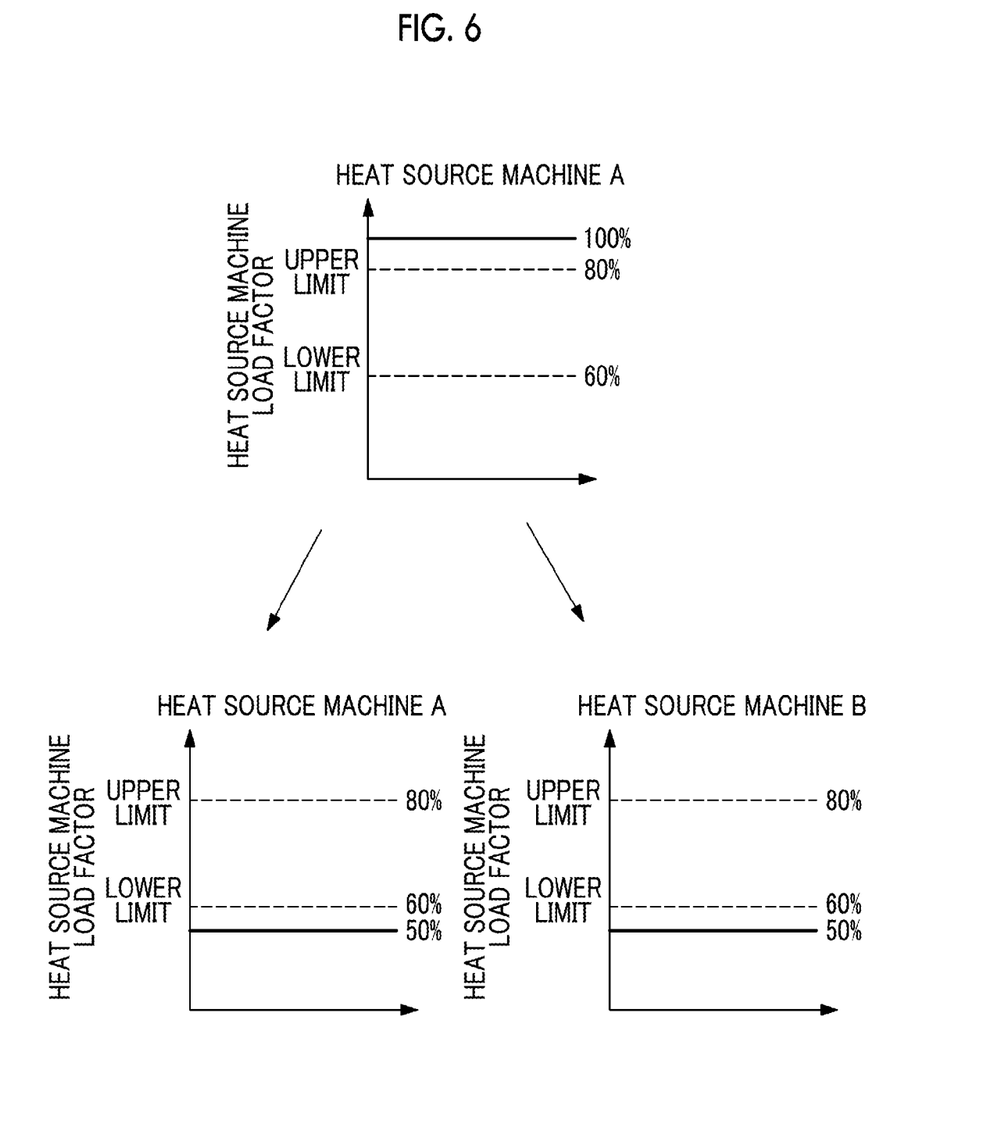
FIG. 6 is a view illustrating a case where a number-of-machines increase cannot be appropriately performed even when an operation is performed with a load of 100%.

For example, as shown in FIG. 6, when the lower limit of the load factor range is set to 60% and the upper limit thereof is set to 80%, if one heat source machine A is operated with a load factor of 100%, and if the condition of Step SA2 of FIG. 5 is satisfied and the number of starting machines is increased by two, the condition in Step SA4 is not satisfied. Therefore, the number-of-machines increase is not performed.

For example, as shown also in the above Formula (2), when the required refrigeration load Q is calculated from the current operational status of the heat source machines, the capability in overload cannot be taken out depending on the specifications of the heat source machines if the heat source machines are operated with a load of 100%. Therefore, a capability above a certain level cannot be output, that is, a load above the certain level is not obtained.

Therefore, the current load of the heat source machines does not become more than the certain value, and even when the number-of-machines increase is practically required, the number-of-machines increase may not occur in the processing flow shown in FIG. 5. This is because the required refrigeration load is calculated from the current operational status of the heat source machines and because the required refrigeration load does not become more than the capability of operating heat source machines and the required refrigeration load may be unable to be correctly obtained.

In the processing flow of FIG. 5, number-of-machines increase conditions or number-of-machines decrease conditions for a predetermined period of time or more are requisite conditions for establishing the number-of-machines increase or the number-of-machines decrease. However, in this processing flow, it is not possible to cope with an abrupt increase or decrease in load.

In the present embodiment, the start instruction unit 23 holds in advance a forced number-of-machines increase load factor set to a value equal to or greater than the upper limit of the load factor range. Thus, if the load factor of the heat source machines reaches the forced number-of-machines increase load factor, one heat source machine is forcedly started without performing the processing of Step SA1 to Step SA4 in FIG. 5.

Additionally, in the case of the number-of-machines decrease, similarly, the stop instruction unit 24 holds in advance a forced number-of-machines decrease load factor set to a value equal to or less than the lower limit of the load factor range. Thus, if the load factor of the heat source machines reaches the forced number-of-machines decrease load factor, one heat source machine is forcedly stopped without performing the processing of Step SA6 to Step SA9 in FIG. 5.

Figure 9:
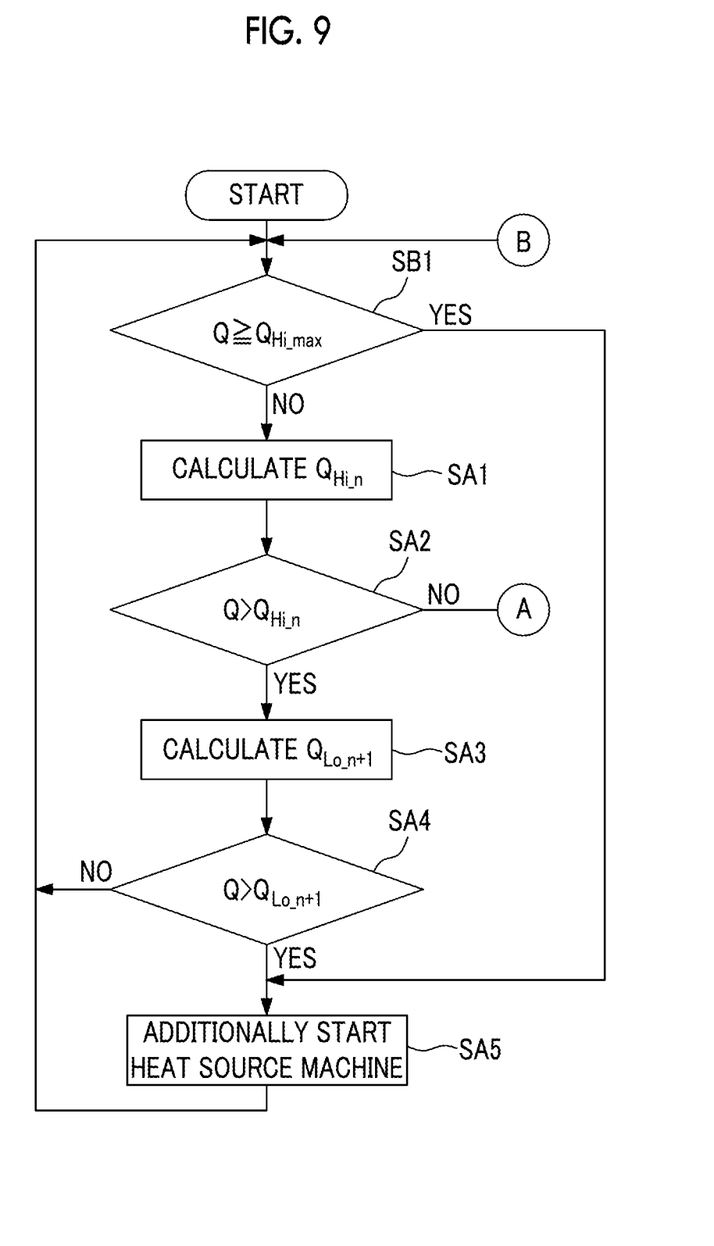
FIG. 9 is a flowchart showing a procedure of a number-of-machines control method related to a third embodiment of the invention.
Figure 10:
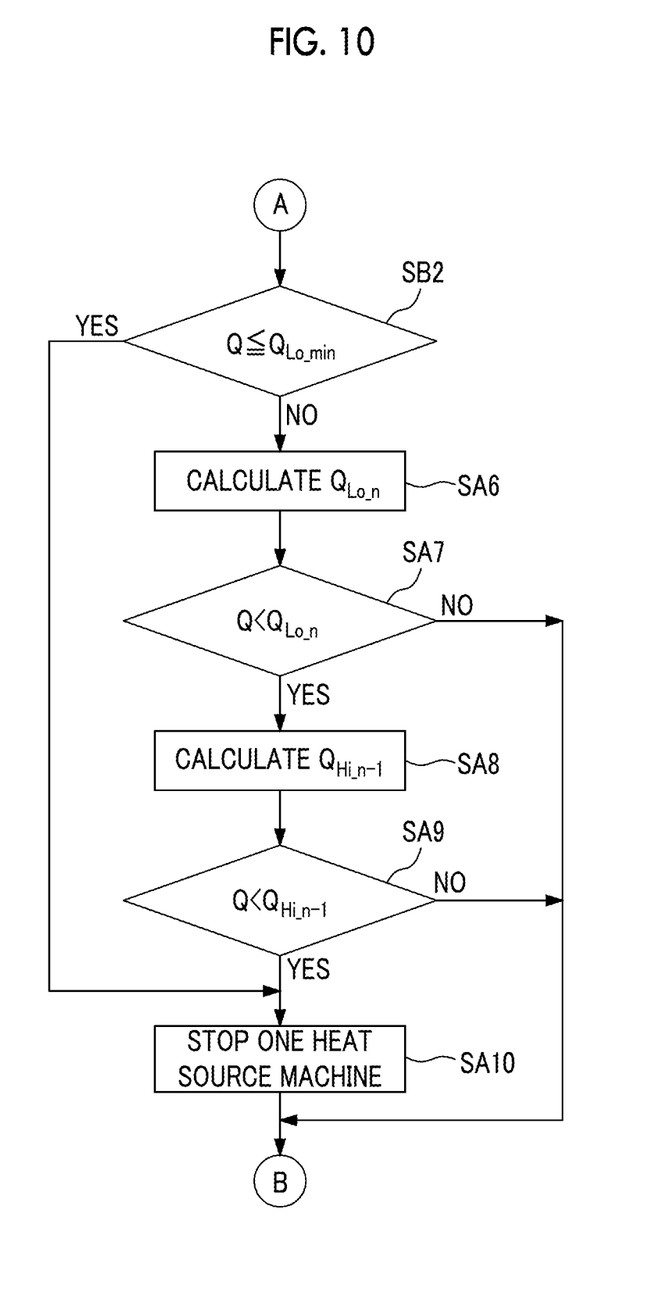
FIG. 10 is a flowchart showing the procedure of the number-of-machines control method related to the third embodiment of the invention.

FIGS. 9 and 10 are the flowcharts showing an example of the number-of-machines control method related to the present embodiment. In Step SB1 of FIG. 9, it is determined whether or not the current required refrigeration load Q is equal to or greater than a first threshold value $Q_{Hi\_max}$ obtained by multiplying the forced number-of-machines increase load factor by the rated load and the number n of currently operating heat source machines. As a result, if the current required refrigeration load Q is equal to or greater than the first threshold value $Q_{Hi\_max}$ the processing proceeds to Step SA5, and a heat source machine is additionally started. Additionally, if the current required refrigeration load Q is smaller than the first threshold value $Q_{Hi\_max}$ in Step SB1, the processing proceeds to Step SA1, and the above-described processing is performed.

If it is determined in Step SA2 that the current required refrigeration load Q is equal to or smaller than the first refrigeration load $Q_{H\_in}$ calculated in Step SA1, the processing proceeds to Step SB2 (refer to FIG. 10), and it is determined whether the current required refrigeration load Q is equal to or smaller than a second threshold value $Q_{Lo\_min}$ obtained by multiplying the forced number-of-machines decrease load factor by the rated load and the number n of currently operating heat source machines. As a result, if the current required refrigeration load Q is equal to or smaller than the second threshold value $Q_{Lo\_min}$ the processing proceeds to Step SA10, and one heat source machine is stopped. On the other hand, if the current required refrigeration load Q is greater than the second threshold value $Q_{Lo\_min}$ the processing proceeds to Step SA6, and the above-described processing is performed.

According to the number-of-machines control device for a heat source system, the method therefor, and the heat source system related to the present embodiment, the forced number-of-machines increase load factor set to a value equal to or greater than the upper limit of the load factor range is set in advance, and if the heat source machine load factor reaches the forced number-of-machines increase load factor, a heat source machine is forcedly additionally started. Thus, the number-of-machines increase can be appropriately performed, and it is possible to more reliably perform the operation satisfying the required load. Additionally, similarly, the forced number-of-machines decrease load factor set to a value equal to or smaller than the lower limit of the load factor range is set in advance, and if the heat source machine load factor reaches the forced number-of-machines decrease load factor, one heat source machine is forcedly stopped. Thus, the number-of-machines decrease can be appropriately performed.

In the present embodiment, it is simply determined whether or not the first threshold value and the second threshold value are reached. Instead of this, however, a heat source machine may be additionally started or one heat source machine may be stopped if such a status is maintained for a predetermined period of time.

In the present embodiment, the load of all the heat source machines is determined as a target. However, the load factors of the respective heat source machines may be individually compared with the forced number-of-machines increase load factor and the forced number-of-machines decrease load factor, and additional start or stop of one heat source machine may be determined.

REFERENCE SIGNS LIST

1: HEAT SOURCE SYSTEM
20: HOST CONTROL DEVICE
22: STORAGE UNIT
23: START INSTRUCTION UNIT
24: STOP INSTRUCTION UNIT

The invention claimed is:

1. A number-of-machines control device for a heat source system that is applied to the heat source system including a plurality of heat source machines and outputs a start command and a stop command to the respective heat source machines, to thereby perform a number-of-machines control of the heat source machines, the number-of-machines control device comprising:
a storage unit that stores basic conditions for increasing the number of machines in which basic conditions when increasing the number of heat source machines are specified in a relationship between a first refrigeration load when operating the respective operating heat source machines at an upper limit of a preset load factor range and a required refrigeration load of the heat source machines, and basic conditions for decreasing the number of machines in which basic conditions when decreasing the number of heat source machines are specified in a relationship between a second refrigeration load when operating the respective operating heat source machines at a lower limit of a preset load factor range and the required refrigeration load of the heat source machines;
a start instruction unit that determines whether or not the basic conditions for decreasing the number of machines are satisfied when the number of currently operating machines is increased by one if the basic conditions for increasing the number of machines are satisfied, and for starting the one heat source machine if it is determined that the basic conditions for decreasing the number of machines are not satisfied; and
a stop instruction unit that determines whether or not the basic conditions for increasing the number of machines are satisfied when the number of currently operating machines is decreased by one if the basic conditions for decreasing the number of machines are satisfied, and for stopping the one heat source machine if it is determined that the basic conditions for increasing the number of machines are not satisfied.

2. The number-of-machines control device for a heat source system according to claim 1,
wherein the start instruction means determines that the basic conditions for increasing the number of machines are satisfied if the required refrigeration load is greater than a first refrigeration load when operating the respective operating heat source machines at an upper limit of a preset load factor range.

3. The number-of-machines control device for a heat source system according to claim 1,
wherein the stop instruction means determines that the basic conditions for decreasing the number of machines are satisfied if the required refrigeration load is smaller than a second refrigeration load when operating the respective operating heat source machines at a lower limit of a preset load factor range.

4. The number-of-machines control device for a heat source system according to claim 1,
wherein the start instruction means determines whether or not a state where the basic conditions for decreasing the number of machines are not satisfied is maintained for a preset predetermined time when the number of currently operating machines is increased by one, and starts the one heat source machine if the state where the conditions are not satisfied is maintained for the predetermined time.

5. The number-of-machines control device for a heat source system according to claim 1,
wherein the stop instruction means determines whether or not a state where the basic conditions for increasing the number of machines are not satisfied is maintained for a preset predetermined time when the number of currently operating machines is decreased by one, and stops the one heat source machine if the state where the conditions are not satisfied is maintained for the predetermined time.

6. The number-of-machines control device for a heat source system according to claim 2,
wherein the required refrigeration load is a value obtained by equalizing the required refrigeration load in a preset predetermined time.

7. The number-of-machines control device for a heat source system according to claim 2,
wherein the start instruction means holds a forced number-of-machines increase load factor set to a value equal to or greater than the upper limit of the load factor range, and forcedly starts the one heat source machine when the load factor of the heat source machines is equal to or greater than the forced number-of-machines increase load factor.

8. The number-of-machines control device for a heat source system according to claim 2,
wherein the stop instruction means holds a forced number-of-machines decrease load factor set to a value equal to or smaller than a lower limit of the load factor range, and forcedly stops the one heat source machine when the load factor of the heat source machines is equal to or smaller than the forced number-of-machines decrease load factor.

9. A heat source system, comprising:
a plurality of heat source machines; and
a number-of-machines control device that outputs a start command and a stop command to the respective heat source machines, to thereby perform a number-of-machines control of the heat source machines, the number-of-machines control device including:
a storage unit that stores basic conditions for increasing the number of machines in which basic conditions when increasing the number of heat source machines are specified in a relationship between a first refrigeration load when operating the respective operating heat source machines at an upper limit of a preset load factor range and a required refrigeration load of the heat source machines, and basic conditions for decreasing the number of machines in which basic conditions when decreasing the number of heat source machines are specified in a relationship between a second refrigeration load when operating the respective operating heat source machines at a lower limit of a preset load factor range and the required refrigeration load of the heat source machines;

a start instruction unit that determines whether or not the basic conditions for decreasing the number of machines are satisfied when the number of currently operating machines is increased by one if the basic conditions for increasing the number of machines are satisfied, and for starting the one heat source machine if it is determined that the basic conditions for decreasing the number of machines are not satisfied; and a stop instruction unit that determines whether or not the basic conditions for increasing the number of machines are satisfied when the number of currently operating machines is decreased by one if the basic conditions for decreasing the number of machines are satisfied, and for stopping the one heat source machine if it is determined that the basic conditions for increasing the number of machines are not satisfied.

10. A number-of-machines control method for a heat source system that is applied to the heat source system including a plurality of heat source machines and outputs a start command and a stop command to the respective heat source machines, to thereby perform a number-of-machines control of the heat source machines, wherein basic conditions for increasing the number of machines in which basic conditions when increasing the number of heat source machines are specified in a relationship between a first refrigeration load when operating the respective operating heat source machines at an upper limit of a preset load factor range and a required refrigeration load of the heat source machines, and basic conditions for decreasing the number of machines in which basic conditions when decreasing the number of heat source machines are specified in a relationship between a second refrigeration load when operating the respective operating heat source machines at a lower limit of a preset load factor range and the required refrigeration load of the heat source machines, are stored in advance, the number-of-machines control method comprising:

a start instruction step of determining whether or not the basic conditions for decreasing the number of machines are satisfied when the number of currently operating machines is increased by one if the basic conditions for increasing the number of machines are satisfied, and starting one heat source machine if it is determined that the basic conditions for decreasing the number of machines are not satisfied; and a stop instruction step of determining whether or not the basic conditions for increasing the number of machines are satisfied when the number of currently operating machines is decreased by one if the basic conditions for decreasing the number of machines are satisfied, and stopping one heat source machine if it is determined that the basic conditions for increasing the number of machines are not satisfied.

\* \* \* \* \*